United States Patent Office 3,138,460
Patented June 23, 1964

3,138,460
PHOTOPOLYMERIZATION AND STRATUM
TRANSFER PROCESS
Steven Levinos, Vestal, N.Y., assignor to General Aniline
& Film Corporation, New York, N.Y., a corporation of
Delaware
No Drawing. Filed Nov. 14, 1960, Ser. No. 68,648
27 Claims. (Cl. 96—28)

This invention relates to photopolymerization and in particular to the photopolymerization of ethylenically unsaturated monomers under alkaline conditions using as a catalyst therefor an aromatic diazo derivative of the type produced by reacting a diazotized primary aromatic amine with an excess of base.

It is known in the art to effect the polymerization of various ethylenically unsaturated organic compounds such as vinyl compounds or vinyl monomers. This reaction is commonly referred to as addition polymerization and it has been extensively investigated and reported both in the chemical literature and in numerous patents. Generally, the addition polymerization of monomeric vinyl compounds is brought about in the presence of a peroxide catalyst at elevated temperatures, the peroxide serving to supply a free radical for initiating the polymerization. Such a reaction can be carried out using a solution of the monomer or it may be desirable to employ the monomer in the form of a dispersion. By using mixtures of various vinyl compounds it is possible to obtain a mixed polymer or copolymer having properties which differ from those of the homopolymer.

It is also recognized that many unsaturated monomers can be caused to polymerize, particularly the more reactive specie, by exposure to high intensity radiation, such as ultraviolet rays of the type emanating from sunlight or a carbon arc. For instance, it is known that methyl acrylate on long standing in sunlight is transformed into a transparent odorless mass of density 1.22 and in this connection, reference is made to Ellis "The Chemistry of Synthetic Resins," p. 1072, vol. 2 (1936). It is to be noted, however, that the polymerization by the use of light alone proceeds at a very much slower rate when compared to polymerization brought about by a peroxide catalyst and heat. Moreover, the use of light unaided by other agents tends to result in a low molecular weight polymer.

The use of radiation alone to bring about polymerization of monomeric substances tends to produce low molecular weight products. Moreover, it is necessary to provide high intensity radiation such as sunlight, flame carbon arc, mercury arc, and the like. It is, however, possible to amplify the efficiency of the exposing radiation by means of certain catalytic materials generally referred to as photosensitizers or photoinitiators. Such entities, under the influence of the exposing radiation, give rise to an activated form, which actually brings about polymerization. In other words, the photoinitiators are activated upon irradiation. It is these active structures which trigger the polymerization reaction.

There are references in the art which disclose the utilization of a photoinitiator for decreasing the photopolymerization time. Although the methods described represent a substantial improvement in the state of the art, the exposure time and intensity of radiation continue to be undesirably high. For instance, a recent patent (U.S.P. 2,722,512) describes the photopolymerization of vinyl monomers in which the various α-substituted acryloins serve as photoinitiators. However, relatively long periods of exposure are required, ranging from at least 15 minutes to several hours for producing a solid polymer. A later patent (U.S.P. 2,880,152) issued March 31, 1959, has described the use of various stannous salts, particularly the chloride, as polymerization initiators. However, even this recently issued publication has not succeed in reducing the time of photopolymerization, the reaction time being of the order of 10–15 minutes to yield substantial quantities of solid polymers.

I have now discovered a method of initiating photopolymerization reactions over a much shorter period of time than heretofore known, and the method of effecting such photopolymerization and photopolymer compositions for carrying out such method constitute the main objects and purposes of this invention.

Other objects and purposes will become apparent as the description proceeds.

In accordance with the invention, I effect photopolymerization of vinyl monomers by exposing a monomer or mixtures thereof to radiation in the presence of a diazo derivative of the type obtained by reacting a diazotized primary aromatic amine with a base. Typically, the invention is practiced by adding a small quantity (relative to the monomer) of the diazotized primary aromatic amine to the monomer and the resulting mixture made alkaline with ammonium hydroxide or any convenient base. The alkaline mixture of diazo compound and monomer is then exposed to a convenient light source—an incandescent tungsten lamp suffices for this—whereby polymerization of the monomer occurs exceedingly rapidly. I have, for instance, succeeded in polymerizing acrylamide in aqueous solution, containing a cross-linking agent, by irradiating a mixture of this monomer with p-morpholinobenzenediazonium chloride in only 40 seconds of exposure. At the end of this time, the monomer had been transformed into a tough resinous mass.

The quantity of base is not crtcial, since it is only necessary that an alkaline environment be maintained; a pH in excess of 7 has been found to be entirely satisfactory. Photopolymerization experiments were carried out wherein the pH of the system varied from slightly more than 7 up to complete alkalinity, i.e., a pH of 14. In all cases excellent yields of polymers were achieved in exceedingly short exposure times.

Nor is an intense source of illumination required to initiate the photopolymerization systems as described herein. Thus, the photopolymerization of the acrylamide as above described was carried out by exposure of the monomer and catalyst mixture to an incandescent lamp of only 375 watts at a distance of about 8". Lower wattage lamps may require a slightly longer exposure. Apparently, the alkalinized diazo compounds are such energetic photoinitiators as to require a relatively few light quanta to be effective.

The quantity of alkalinized diazotized amine relative to that of the monomer can be quite small. I have obtained practical rates of photopolymerization wherein the diazo compound varied from about 0.01 to 1.0% of the monomer. There appears to be some dependence of photopolymerization rate to the quantity of photoinitiator, which makes it desirable to operate within the ratio mentioned above. In general, I prefer to employ about 0.07% of alkaline diazo compound calculated on the basis of monomer. This ratio results in very rapid photopolymerization times and represents a practical and economical amount of catalytic material. It is, of course, to be understood that higher percentages of catalyst may be employed, but the increased rate of polymerization may be at least partially offset by the increase in cost.

The photopolymerizations as described herein can be brought about either in aqueous solution or in organic solvents or mixtures of these. Thus, if a particular monomer is water soluble, this serves as a suitable medium for the photopolymerization. On the other hand, when using water insoluble monomers, such as acrylonitrile, I can utilize organic solvents, or mixtures of such solvents with water, i.e., a mixture of ethanol and water. It is a distinct advantage of the alkalinized diazotized amines as described herein that such photoinitiators, because of their general solubility, operable efficiently both in aqueous media or in organic solvent media. Typical solvents which I have found suitable as reaction media include methanol, ethanol, n-propanol, dioxane, acetone, dimethylformamide, dimethylacetamide, and mixtures thereof.

As previously noted elsewhere, although alkaline conditions are essential for promoting the photopolymerizations, the degree of alkalinity is not critical, it being only necessary that a pH of 7 be exceeded. Any of the common alkali bases can be used for alkalinizing the diazotized primary aromatic amine and in this connection reference is made to ammonia, various primary, secondary and tertiary aliphatic amines, mineral bases such as alkali metal hydroxides or alkali metal salts of weak acids as represented by sodium carbonate, ammonium phosphate and the like.

Aromatic amines which can be diazotized to yield diazonium compounds for use as photoinitiators as described herein are typified in the following list:

4-amino caprylanilide (or 4-caprylamido aniline)
5-stearamido orthanilic acid
5-lauramido anthranilic acid
3-amino-4-methoxydodecanesulfonanilide
4-diethylaminoaniline
2-ethoxy-4-diethylaminoaniline
5-dimethylamino orthanilic acid
4-(di-$\beta$-hydroxyethylamino) aniline
4-cyclohexylaminoaniline
4-piperidinoaniline
4-thiomorpholinoaniline
4-hydroxyaniline
3-methyl-4-ethylaminoaniline
4-aminodiphenylamine
3-methyl-4-($\beta$-hydroxyethylamino) aniline
5-amino salicyclic acid
o-Pentadecoxyaniline
N-$\beta$-hydroxyethyl-N-ethyl-p-phenylene diamine
Benzidine-2,2'-disulfonic acid
Benzene-2,2'-disulfonic acid
2,5-dichloro-1-amino-benzene
4-chloro-2-amino-1-methylbenzene
4-chloro-2-amino-1-methoxy benzene
2,5-dichloro-1-methyl-4-aminobenzene
2-amino-4-methoxy-5-benzoylamino-1-chlorobenzene
2,5-dichloro-4-amino-1-methylbenzene
4,6-dichloro-2-amino-1-methylbenzene
4-amino-1,3-dimethylbenzene
4,5-dichloro-2-amino-1-methylbenzene
5-nitro-2-amino-1-methylbenzene
5-nitro-2-amino-1-methoxybenzene
3-amino-4-methoxy-6-nitro-1-methylbenzene
3-amino-4-methoxy-6-benzoylamino-1-methylbenzene
6-amino-4-benzoylamino-1,3-dimethoxybenzene
6-amino-4-benzoylamino-1,3-dimethoxy-diphenyl
6-amino-3-benzoylamino-1,4-diethoxybenzene
6-amino-3-benzoylamino-4-ethoxy-1-methoxybenzene
6-amino-3-benzoylamino-1,4-dimethoxybenzene
p-Amino-diphenylamine
p-Phenylenediamine-monosulfo acid
N-$\beta$-hydroxyethyl-N-methyl-p-phenylenediamine
N-$\beta$-hydroxyethyl-N-ethyl-p-phenylenediamine
p-Ethylamino-m-toluidine
p-Diethylamino-aniline
p-Dimethylamino-aniline
N-benzyl-N-ethyl-p-phenylenediamine
p-Dimethylamino-o-toluidine
p-Diethylamino-o-phenetidine
4-benzoylamino-2,5-diethoxyaniline
2-amino-5-dimethylamino-benzoic acid
N,N-di-($\beta$-hydroxyethyl)-p-phenylenediamine
p-(N-ethyl-N-$\beta$-hydroxyethylamino)-o-toluidine p-Di-$\beta$-hydroxethylamino-o-chloraniline
p-Ethylamino-aniline
p-Phenylenediamine
2,5-diethoxy-4-(4'-ethoxyphenylamino)-aniline
p-4-morpholinylaniline
p-1-pipyridylaniline
$\alpha$ and $\beta$ naphthyl amines Diazonium compounds produced from the foregoing amines can be employed in the form of their stable diazonium sulfates, chlorobenzene sulfonates or borofluorides, or in the form of the double salts of the diazonium chloride with zinc chloride, cadmium chloride, ferric chloride or stannic chloride.

Any normally liquid to solid photopolymerizable unsaturated organic compound is applicable in the practice of my invention. Preferably, such compounds should be ethylenically unsaturated, i.e., contain at least one nonaromatic double bond between adjacent carbon atoms. Compounds particularly advantageous include vinyl or vinylidene compounds containing a $CH_2=C<$ group activated by direct attachment to a negative group such as halogen, $>C=O$, $—C\equiv N$, $—C\equiv C—$, $—O—$, or aryl. Examples of photopolymerizable unsaturated organic compounds include acrylamide, acrylonitrile, N-ethanol acrylamide, methylolacrylamide, methacrylic acid, acrylic acid, calcium, acrylate, methacrylamide, vinyl acetate, methylmethacrylate, methacrylate, ethylacrylate, vinyl benzoate, vinyl pyrrolidone, vinylmethyl ether, vinylbutyl ether, vinylisopropyl ether, vinylisobutyl ether, vinylbutyrate, butadiene or mixtures of ethyl acrylate with vinyl acetate, acrylonitrile with styrene, butadiene with acrylonitrile and the like.

The above ethylenically unsaturated organic compounds, or monomers as they are sometimes called, may be used either alone or in admixture in order to vary the physical properties such as molecular weight, hardness, etc. of the final polymer. Thus, in order to produce a vinyl polymer of the desired physical properties, it is a recognized practice to polymerize the vinyl monomer in the presence of a small amount of an unsaturated compound containing at least two terminal vinyl groups each linked to a carbon atom in a straight chain or in a ring. The function of such compounds is to cross-link the polyvinyl chains. This technique, as used in polymerization, is further described by Kropa and Bradley in vol. 31, No. 12, of "Industrial and Engineering Chemistry," 1939. Cross-linking agents which can be utilized for the purpose described herein include N,N'-methylene-bis-acrylamide, triallyl cyanurate, divinyl benzene, divinyl ketones and diglycol diacrylate. Generally speaking, increasing the quantity of cross-linking agents increases the hardness of the polymer obtained in the range wherein the ratio of monomer to cross-linking agent varies from 10:1 to 50:1.

An important advantage of using my process to effect non-imagewise or bulk polymerization lies in the fact that elevated temperatures are unnecessary. Ordinarily, when polymerization reactions are carried out in the presence of a peroxide catalyst alone, external heat must be provided.

However, in my method of bulk polymerization, a reactor is charged with an alkalinized mixture of monomer and diazonium compounds and the vessel or container is subjected to radiation. Photopolymerization ensues without the need for any external heat. The aforesaid method of polymerization is particularly useful in those applications where it is desired that the polymer conforms to the shape and dimensions of the reacting vessel. Such a situation is difficult to achieve when the reacting vessel is of an intricate shape so that the application of heat and stirring in the presence of the conventional peroxide catalyst is rendered impractical. By incorporating my radiation sensitive catalyst in admixture with the monomer and placing the reaction vessel and irradiating, photopolymerization ensues smoothly, rapidly and evenly throughout the reacting vessel even though the latter be of an odd or unusual shape or configuration.

In addition to light, the photosensitive compositions disclosed herein undergo rapid photopolymerization when exposed to other electromagnetic radiations and in this connection mention is made of ultraviolet rays.

In describing my photopolymerization process, reference has been made only to bulk polymerization, that is, photopolymerization of a monomer to produce a mass of polymeric or resinous substance. However, my invention is eminently suitable for the production of photographic resist images.

I produce polymeric photographic images by exposing to light a coating comprising a mixture of a photographic colloidal carrier, a polymerizable organic compound such as a vinyl monomer and a light sensitive aromatic diazo compound of the p-phenylene diamine series. The result of the exposure is to destroy the diazo compound in the exposed areas. After exposure, the coating is made alkaline, whereupon polymerization rapidly ensues in those areas containing residual undecomposed diazo compounds. Removal of the residual monomer composition in the exposed areas can be accomplished by a simple washing operation. This system for forming polymeric photographic images is simple to carry out and moreover requires only a relatively low intensity light source. I have, for instance, obtained excellent results using the radiations emanating from a 375 watt tungsten lamp. My invention is thus a decided improvement over the techniques described in the prior art which requires a source of intense radiation in order to effectively bring about photopolymerization to form a sufficiently toughened or hardened image in the exposed areas.

The rapidity with which I can effect the photopolymerization described herein can be attributed to the catalytic activity of the diazo photoinitiators in the presence of an alkaline environment. Although I have not ascertained with certainty a mechanism or theory which accounts for this catalytic activity, it is my opinion that the alkaline environment reacts with the diazotized primary aromatic amine to form a diazotate which is the active entity responsible for the rapid polymerization reactions. In support of this contention, I have found that potassium p-nitrobenzenediazotate is an excellent catalyst in bringing about polymerization of vinyl monomers. However, this theory is offered only as an explanation to account for or to explain the results obtained herein, and I do not wish to be bound by such a hypothesis.

In forming photographic resist images, according to the invention, I have found it preferable to use a hydrophilic photographic colloid as a carrier for the mixture of monomer and diazotized primary aromatic amine. Suitable colloids for this purpose include polyvinyl alcohol, gelatin, casein, glue, saponified cellulose acetate, carboxymethyl cellulose, starch and the like.

Numerous materials can serve as supports or bases for the radiation sensitive coatings prepared in accordance with the process described herein, and, in this connection, mention is made of cellulose ester supports, including the hydrophobic variety of the type having a surface made hydrophilic by partial saponification treatment, metal, such as aluminum or zinc, terephthalic acid ester polymers, paper, glass or the like.

The photopolymerization can be carried out under a wide variety of conditions employing numerous modifications. My system of photopolymerization is particularly valuable in the field of photography where its high speed and response to relatively low intensity radiation sources make it ideal for imagewise polymerization. One useful application of my process, for example, is the production of relief printing plates for use in the graphic arts. Such plates can be fabricated by coating a mixture of a colloidal carrier material and a monomer or monomers in a suitable solvent plus a small quantity of light sensitive diazo compound of the p-phenylenediamine series. The coating, so obtained, after drying, can then be exposed imagewise to a radiation source such as an incandescent bulb followed by treatment with an alkaline material whereby polymerization rapidly takes place in the unexposed areas containing residual light sensitive diazo compounds. A resist is thus formed of the photopolymerized polymer which can be used as a positive working relief plate. By employing a hydrophilic surface as the support for the coating, such as a partially saponified cellulose acetate, a plate is produced having a greasy ink receptive and water receptive areas. It can then be used as a positive working offset plate for production of printed copies.

My invention can likewise be used for production of black and white prints. For this, a light sensitive plate is prepared having coated thereon a layer comprising an unsaturated polymerizable organic compound a photographic colloidal carrier material, a light sensitive diazo compound of the p-phenylenediamine series and a finely divided black pigment. The plate is then exposed beneath a silver positive and is then made alkaline whereby polymerization rapidly ensues in the unexposed areas containing residual undecomposed diazo compounds. After washing with water to remove the unpolymerized monomer in the exposed regions, there is obtained a polymeric photographic positive image. Another photographic application of my invention is in color reproduction. For example, a light sensitive plate is prepared as described above, i.e., containing a photographic colloidal carrier, a monomer and a light sensitive diazonium salt of the p-phenylenediamine series. This is then exposed to one of the primary color aspects of the subject using a color separation positive. After treatment with an alkaline material, such as aqueous ammonia or trisodium phosphate, to effect polymerization in the unexposed areas, the so-obtained resist image is then subtractively dyed. By subjecting other light sensitive plates to the remaining primary color aspects of the subject, processing as described above to effect polymerization in the unexposed areas, followed by dyeing with the appropriate subtractive dye, the remaining color aspects of the subject are recorded. Super imposition of these subtractively colored images will then reproduce the original subject.

My photosensitive compositions are especially adaptable to those reproduction processes known in the art as peel-apart methods. This is a photographic technique wherein an exposed photographic layer bearing a latent image is placed in contact with a receiving material. By interpolating a developing material between the contacted sheets an image is transferred from the exposed sheet to the receiving sheet, at which point it is transformed to an image of high optical opacity.

As an illustration of how the photopolymer compositions as described herein can be used in a peel-apart process, I coat a support with a photosensitive mixture of monomer and stabilized diazo compound while employing gelatin as a photographic carrier therefor. After drying, this coating is treated with an alkaline material such as ammonia, whereby the diazo compound is transformed into the diazotate by the action of the alkaline agent. The so-obtained layer now containing the radiation sensitive diazotate is exposed through the base, whereby photopolymerization occurs rapidly in those areas of the layer acted upon by the said radiation. In the unexposed areas, polymerization does not take place, and the mixture of monomer and gelatin, when placed in contact with a suitable receiving layer, transfers thereto. There is thus obtained a resist image in the exposed layers of the coating. This resist can be transformed into an image of high optical opacity by dyeing, pigmenting, or by other methods known to the art.

As previously pointed out, the diazotates produced according to the process described herein catalyze polymerization of vinyl monomers in the presence of radiation. However, these entities also bring about polymerization in the absence of radiation, although the dark reaction is much slower. This property of the diazotate catalyst can be further utilized in the peel-apart process. The mixture of monomer and gelatin which diffuses into the receiving sheet as above described, also contains quantities of diazotates which were protected by the pattern from exposure. As a consequence, after standing for a short time, the monomer undergoes polymerization as a result of the dark catalytic activities of the diazotate and one also obtains a resist image on the receiving material. There is thus formed in my peel-apart process a resist image on the original coating due to polymerization on exposure to radiation, and a second resist image due to the polymerization of the diffused monomer image on the receiving material as a result of the slower dark reaction.

Thus the differential catalyzation between the diazotates in the presence of radiation on the one hand and the slower catalyzation activity of the diazotates on the other hand, offer to the art a two-fold method for producing polymeric resist images, one of which is positive, the other negative.

For the uses which the above photopolymers may be employed are included such photographic and lithographic applications as for example the production of bi-metallic printing plates, etched copper, halftone images, printing plates having cellulose ester support, grained zinc or aluminum lithographic plates, zincated lithographic printing plates, ungrained copper printing plates for preproofing, copper chromium and bimetallic plates, etc.

Those skilled in the art employing the description and teachings of the present invention can ascertain those combinations of monomer and catalyst which will yield the best results.

In the following examples are illustrated the various ramifications and aspects of my invention, although it is to be understood that the invention is not restricted thereto.

BULK POLYMERIZATION

Example I

A composition was prepared from the following components:

| | Parts |
|---|---|
| Acrylamide | 180 |
| N,N'-methylene-bis-acrylamide | 7 |
| Water | 120 |

To 2 cc. of this composition there was added 10 milligrams of N-ethyl-N-hydroxyethyl benzene diazonium chloride followed by 5 drops of 29% ammonium hydroxide solution. The mixture was stirred thoroughly and exposed at a distance of 7½" to the light emanating from a 375 watt tungsten lamp. At the end of 40 seconds, a solid resinous mass had formed.

Example II

The process of Example I was repeated, but with the exception that 2½ cc. of the monomer solution was used and 2 drops of ammonia. Polymerization to a tough resinous mass took place in 45 seconds.

Example III

The process of Example I was repeated with the exception that the diazonium compound was para-morpholino benzenediazonium chloride. Rapid polymerization to a hard tough resinous mass took place in 40 seconds.

Example IV

The procedure of Example III was repeated with the exception that 2 drops of ammonia was used. Polymerization occurred in 90 seconds.

Example V

In this example 2½ cc. of the monomer composition of Example I was used and the diazonium compound was para - diethyl - aminobenzenediazonium chloride. The quantity of ammonium hydroxide was 2 drops. Polymerization to a hard resinous mass occurred in 100 seconds.

Example VI

To 2 cc. of the monomer composition, prepared in accordance with Example I, was added 5 milligrams of potassium p-nitrobenzene diazotate. In this instance ammonia was not used since the diazotate had already been preformed. On irradiation with a 375 watt tungsten lamp as in the previous examples, polymerization occurred rapidly, and at the end of 40 seconds a hard resinous polymeric mass had formed.

Example VII

The following composition was prepared:

| | | |
|---|---|---|
| Diazotized p-morpholino aniline (as zinc chloride salt) | mgs | 15 |
| Water | cc | 0.5 |
| Ethanol | cc | 0.5 |
| Acrylonitrile | cc | 1.5 |
| 28% ammonium hydroxide | drops | 5 |

The above described mixture was placed in a small test tube and subjected to the radiation emanating from a 375 watt tungsten lamp; the lamp was placed at a distance of 8 inches. At the end of 2 minutes the powdery polymer had started to form and the reaction continued with formation of more polymer, even when the source of illumination was removed. After the reaction had terminated, there remained in the test tube a thick slush of polymer.

Example VIII

The composition having the following component was prepared:

| | | |
|---|---|---|
| Aqueous methylolacrylamide | cc | 2 | prepared by substituting this for the acrylamide of the previous examples.

| | | |
|---|---|---|
| p-Diethylaminobenzene-diazonium chloride (ZnCl$_2$) | mg | 10 |
| 28% ammonium hydroxide | drops | 2 |

This mixture was irradiated with the light emanating from a 375 watt incandescent bulb placed at a distance of 8 inches and polymerization was complete in 15 seconds. A similarly prepared composition in the absence of irradiation required 200 seconds to effect photopolymerization.

IMAGEWISE POLYMERIZATION

Example IX

PHOTOPOLYMER STENCIL

To the monomer composition of Example I containing poly-N-vinyl-pyrrolidone was added a small quantity of p-morpholinobenzene diazonium chloride (as the zinc double salt) or p-diethylaminobenzenediazonium chloride as the zinc double salt. As such, polymerization of the monomer cannot take place, due to the acidity of the system. This mixture was coated on a support of silk screen. On exposure to light through a negative image, the diazonium compound was decomposed in the image areas. White light or ultra-violet light may be used, although it is obvious that decomposition of the diazonium compound will be effected more rapidly with the shorter wave length exposure. The layer was swabbed with an alkaline solution which can be an aqueous solution of a metal alkali or NH$_4$OH or Na$_3$PO$_4$ which generated the diazotate in the non-image area, whereupon polymerization took place. During the swabbing operation, unpolymerized material was partially or completely removed. The resulting stencil was then mounted on the drum of a duplicator and multiple prints run off by forcing printing ink or fluid through the "open" areas corresponding to the original image.

Example X

OFFSET PRINTING PLATE

To the monomer composition of Example I containing gelatin, octyl acrylamide and butyl acrylamide was added the diazonium compound as in the case of Example VII. The mixture was coated on a plastic support. On exposure to light through a positive image, the diazonium compound was decomposed in the non-image areas. The layer was then swabbed with an alkaline solution as previously indicated to form the diazotate in the image areas, whereupon polymerization occurred. During the swabbing operation, unpolymerized areas of the coating were partially or completely removed, leaving a lipophilic relief image. The plate was then used in a conventional offset printing press with lipophilic inks for the production or printing of multiple copies.

Example XI

The following composition was prepared:

| | |
|---|---|
| N-vinyl-2-pyrrolidone | cc 2 |
| p-Morpholinobenzenediazonium chloride | mg 10 |
| 29% ammonium hydroxide | drops 5 |

The mixture was then exposed for 10 minutes to the radiation emanating from a 375 watt incandescent lamp at a distance of 8 inches. The light source was then removed and at the end of a short time thereafter an insoluble polymeric mass had begun to form.

Other diazonium compounds and monomers can be substituted for those of the preceding examples to produce resists of varying properties.

It is to be understood that the photosensitive compositions described herein are contained or otherwise employed in combination with a photographic colloid carrier when such photosensitive compositions are used in imagewise polymerization for the production of polymeric photographic images.

I claim:

1. A proces of producing polymeric photographic images which comprises subjecting to a single imagewise exposure with electromagnetic radiation having a wave length extending from the ultraviolet through the visible range, a radiation sensitive layer comprising a monomer containing the terminal grouping $CH_2=C=$ which is directly attached to an electronegative group, a radiation sensitive, stabilized aromatic diazonium compound of the p-phenylenediamine series in an amount ranging from 0.01 to 1.0 percent based on the weight of monomer and a photographic colloid carrier, said layer having a pH below 7.0, the duration and intensity of said exposure being sufficient to photodecompose the diazonium compound in the exposed areas; contacting at room temperature the so-exposed layer with an aqueous solution of an alkaline reacting substance selected from the group consisting of ammonia, primary, secondary and tertiary amines, alkali metal hydroxides, alkali metal carbonates, alkali metal phosphates, ammonium carbonate and ammonium phosphate, in an amount sufficient to raise the pH of the exposed layer to a level above 7.0 and to form the diazotate of the diazonium compound; thereby affecting polymerization of the monomer in the unexposed areas containing residual diazonium compound, said diazotate being the sole polymerization catalyst, removing the residual unpolymerized compound in the exposed areas by washing in order to obtain a polymeric photographic image corresponding to the non-exposed areas of the layer.

2. The process according to claim 1 wherein the residual unpolymerized compound is removed by washing.

3. The process according to claim 1 wherein the electromagnetic radiation is ultra-violet light.

4. The process according to claim 1 wherein the polymerizable compound is a vinyl monomer.

5. The process according to claim 4 wherein the vinyl monomer is acrylamide.

6. The process according to claim 1 wherein the alkaline substance is ammonia.

7. The process according to claim 4 wherein is added to the vinyl monomer a cross-linking agent having at least two terminal vinyl groups.

8. The process according to claim 7 wherein the cross-linking agent is selected from the class consisting of N,N'-methylene-bis-acrylamide, triallyl cyanurate, divinyl benzene, divinyl ketones and diglycol diacrylate.

9. The process according to claim 1 wherein the aromatic diazonium compound is an N,N-disubstituted p-phenylenediamine.

10. A process of photopolymerizing a monomer which comprises subjecting to a single exposure with electromagnetic radiation having a wave length extending from the ultraviolet through the visible range, a radiation sensitive composition comprising a monomer containing the terminal grouping $CH_2=C<$ which is attached to an electronegative group, a radiation sensitive, stabilized aromatic diazonium compound of the p-phenylenediamine series in an amount ranging from 0.01 to 1.0 percent based on the weight of monomer, and an aqueous solution of an alkaline reacting substance selected from the group consisting of ammonia, primary, secondary and tertiary amines, alkali metal hydroxides, alkali metal carbonates, alkali metal phosphates, ammonium carbonate and ammonium phosphate in an amount sufficient to raise the pH to a level above 7.0 and to convert the diazonium compound into the diazotate of the diazo compound, thereby affecting polymerization of the monomer without the use of elevated temperatures, said diazotate being the sole photopolymerizing catalyst.

11. The process according to claim 10 wherein the electromagnetic radiation is ultraviolet light.

12. The process according to claim 10 wherein the polymerizable compound is a vinyl monomer.

13. The process according to claim 12 wherein the vinyl monomer is acrylamide.

14. The process according to claim 10 wherein the alkaline material is ammonia.

15. The process according to claim 12 wherein is added to the vinyl monomer a cross-linking agent having at least two terminal vinyl groups.

16. The process according to claim 15 wherein the cross-linking agent is selected from the class consisting of N,N'-methylene-bis-acrylamide, triallyl cyanurate, divinyl benzene, divinyl ketones and diglycol diacrylate.

17. The process according to claim 10 wherein the aromatic diazo compound is an N,N-disubstituted p-phenylenediamine.

18. A process of producing a polymeric photographic transfer image which comprises subjecting to a single imagewise exposure with electromagnetic radiation having a wave length extending from the ultra-violet through the visible range a radiation sensitive layer comprising a monomer containing the terminal grouping $CH_2=C<$ which is attached to an electronegative group, gelatin, a radiation sensitive stabilized aromatic diazonium compound of the p-phenylenediamine series in an amount ranging from 0.01 to 1.0 percent based on the weight of monomer, said layer having been treated prior to exposure with an aqueous solution of an alkaline reacting substance selected from the group consisting of ammonia, primary, secondary and tertiary amines, alkali metal hydroxides, alkali metal carbonates, alkali metal phosphates, ammonium carbonate and ammonium phosphate in an amount sufficient to convert the diazonium compound into the corresponding diazotate, thereby causing photopolymerization in the exposed areas; contacting rapidly at room temperature the so-exposed and wetted alkaline layer with a suitable receiving layer in order to transfer the unexposed portions of the image to the receiving layer, peeling apart the original layer and the receiving layer, thereby forming a positive image on the receiving layer.

19. The process according to claim 18 wherein the electromagnetic radiation is ultraviolet light.

20. The process according to claim 10 wherein the polymerizable compound is a vinyl monomer.

21. The process according to claim 20 wherein the monomer is acrylamide.

22. The process according to claim 18 wherein the alkaline substance is ammonia.

23. The process according to claim 20 wherein is added to the vinyl monomer a cross-linking agent having at least two terminal vinyl groups.

24. The process according to claim 23 wherein the cross-linking agent is selected from the class consisting of N,N'-methylene-bis-acrylamide, triallyl cyanurate, divinyl benzene, divinyl ketones and diglycol diacrylate.

25. The process according to claim 18 wherein the aromatic diazo compound is an N,N-disubstituted p-phenylenediamine.

26. A process of producing a polymeric photographic transfer image which comprises subjecting to a single imagewise exposure with electromagnetic radiation having a wave length extending from the ultra-violet through the visible range a radiation sensitive layer comprising a monomer containing the terminal grouping $CH_2=C<$ which is attached to an electronegative group, a radiation sensitive stabilized aromatic diazonium compound of the p-phenylenediamine series in an amount ranging from 0.01 to 1.0 percent based on the weight of monomer, and a photographic colloid carrier, said layer having been treated prior to exposure with an aqueous solution of an alkaline reacting substance selected from the group consisting of ammonia, primary, secondary and tertiary amines, alkali metal hydroxides, alkali metal carbonates, alkali metal phosphates, ammonium carbonate and ammonium phosphate in an amount sufficient to raise the pH of the layer to a level above 7.0 and to convert the diazonium compound into the corresponding diazotate, thereby causing photopolymerization in the exposed areas; contacting rapidly at room temperature the so-exposed and wetted alkaline layer with a suitable receiving layer in order to transfer the unexposed portions of the image to the receiving layer, peeling apart the original layer and the receiving layer, and exposing the transferred image to light, thereby accelerating the polymerization and forming a positive image on the receiving layer.

27. The process according to claim 18 wherein the base is ammonia.

References Cited in the file of this patent

UNITED STATES PATENTS

| 1,618,505 | Beebe et al. | Feb. 22, 1927 |
| 2,875,047 | Oster | Feb. 24, 1959 |
| 2,996,381 | Oster et al. | Aug. 15, 1961 |
| 3,060,022 | Duerr | Oct. 23, 1962 |

FOREIGN PATENTS

| 1,055,814 | Germany | Apr. 23, 1959 |

OTHER REFERENCES

Cooper Chemistry and Industry, April 25, 1953, pp. 407–408. (Copy in Scientific Library.)

Marvel et al.: Journal of the American Chemical Society, vol. 75, 1953, pp. 3846–3848. (Copy in Scientific Library.)